US006727902B2

(12) United States Patent
Tournier

(10) Patent No.: US 6,727,902 B2
(45) Date of Patent: *Apr. 27, 2004

(54) PROCESS FOR CODING CHARACTERS AND ASSOCIATED DISPLAY ATTRIBUTES IN A VIDEO SYSTEM AND DEVICE IMPLEMENTING THIS PROCESS

(75) Inventor: Christian Tournier, Seyssinet-Pariset (FR)

(73) Assignee: Thomson Licensing, S.A., Boulogne-Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,389

(22) Filed: Nov. 20, 1998

(65) Prior Publication Data

US 2002/0070949 A1 Jun. 13, 2002

(30) Foreign Application Priority Data

Nov. 24, 1997 (FR) ........................................ 97 14724

(51) Int. Cl.[7] ........................................ G06T 11/00

(52) U.S. Cl. ........................................ 345/467; 345/468

(58) Field of Search ........................................ 345/116, 141, 345/157, 150, 192, 194, 507, 526, 430, 511, 431, 514, 441, 467, 468, 619, 589, 581, 810; 348/468

(56) References Cited

U.S. PATENT DOCUMENTS 4,398,190 A 8/1983 Long et al. ................. 340/728
4,405,830 A * 9/1983 Foster et al. ............ 345/116 X
4,999,706 A * 3/1991 Kinghorn .................... 348/468
2002/0033831 A1 3/2002 Nagoya ...................... 345/810
2002/0054145 A1 5/2002 Kitagawa et al. ........... 345/619
2002/0054147 A1 5/2002 Kitagawa et al. ........... 345/810

OTHER PUBLICATIONS

Richard Bugg, "Hardware minimiation of videotex or teletext decoders by exploitation of display redundancy", IEE Transactions on Consumer Electronics, vol. 30, No. 3, Aug. 1984, pp. 416–420.

Copy of a French search report citing the above listed documents AA & AR.

* cited by examiner

*Primary Examiner*—Matthew Luu
(74) *Attorney, Agent, or Firm*—Joseph S. Tripoli; Joseph J. Laks; Reitseng Lin

(57) ABSTRACT

The process for coding characters and associated display attributes in a video system consists in:

- coding a first cue of character type in a first word;
- coding a second cue of display attribute type, a so-called parallel attribute, defining the color or aspect associated with a character, in a second word, comprising at least one selection bit whose value indicates whether the parallel display attribute transmitted is a color attribute or a shape attribute;
- storing the value of the said parallel display attribute;
- using, for display of the current character, the color attribute, respectively the shape attribute, transmitted at the same time as the current character, or by default, the color attribute, respectively the shape attribute, stored during transmission of a previous character.

15 Claims, 2 Drawing Sheets

PROCESS FOR CODING CHARACTERS AND ASSOCIATED DISPLAY ATTRIBUTES IN A VIDEO SYSTEM AND DEVICE IMPLEMENTING THIS PROCESS

BACKGROUND OF THE INVENTION

1. Field of the Invention

The present invention relates to a process for coding characters and associated display attributes in a video system making it possible to display text or graphics in a video image. The invention also concerns a device for generating characters in a video system implementing this process.

2. Description of the Related Art

The displaying of characters on a video screen is necessary in particular for applications in which the video image is replaced by text intended to supply the user with information, but also for producing subtitles incorporated into a video image, for example to improve the comfort of the hard of hearing. Another application relates to the displaying of menus for adjusting television monitors which guide the user step by step so that he can easily adjust his television receiver.

These various applications require an ever more meticulous display involving an increase in both the size of the character sets available and the number of display parameters defining the color and the shape of each character displayed.

Known character generators generally possess a read-only memory (ROM), termed the character font memory, in which are stored the various models of characters available, in the form of matrices where each intersection represents a pixel, some pixels representing the shape of the character and others representing the background of the character.

The codes of the characters to be displayed are stored in a random-access memory (RAM) which supplies the above described read-only memory with the code of the character.

The appearance of the characters on the screen is governed by parameters called display attributes which define the color of the characters or their aspect on the screen. It is thus possible in particular to define the color of the shape and/or of the background of the character, the size (single, double), underlining, the displaying of a dark outline around the shape of the character, the flashing of the character, etc. by virtue of these display attributes. The display attributes defining the aspect of the characters on the screen will hereinafter be referred to as shape attributes whilst the attributes defining the colour of the background or of the shape of the character will be referred to as colour attributes.

In the prior art, it has been proposed to code the characters over one byte (one word 8 bits long) and to transmit the display attributes in so-called "serial" mode, that is to say that the cue coded over one byte contains either the code of a character to be displayed, or a code corresponding to a display attribute which is to be used for the next word. The display attribute codes are transmitted only when no character is displayed, that is to say between the words.

This mode of coding is very economical in terms of necessary memory space but it provides very few display possibilities. This is because each word necessarily has a unique colour and aspect and only one parameter out of the colour (of the background or of the shape of the characters) or the aspect can be changed from one word to the next.

To offer more display possibilities it has also been proposed to use a coding over two bytes, the first byte containing, as above, either a code of a character to be displayed, or a display attribute code transmitted in serial mode, called a serial attribute, and the second byte containing a so-called "parallel" display attribute code containing both a shape attribute and a colour attribute for defining the aspect and the colour of the character defined in the first byte.

This solution is effective in increasing the display possibilities by making it possible to define a background colour and shape colour as well as an aspect which is specific to each character. However, the choice of colours and display aspects is limited by the one-byte size reserved for the shape and colour attributes.

SUMMARY OF THE INVENTION

One object of the invention is to improve the display possibilities by offering a wider choice of colours and shapes so as to define the appearance of the characters on the screen and to do so at negligible additional cost as compared with the prior art.

The subject of the invention is a process for coding characters and associated display attributes in a video system consisting in:

- coding a first cue of character type in a first word N bits long;
- coding a second cue of display attribute type, a so-called parallel attribute, defining the colour or aspect associated with a character, in a second word, M bits long, comprising at least one selection bit whose value indicates whether the parallel display attribute transmitted is a colour attribute or a shape attribute;
- storing the value of the parallel display attribute;
- using, for display of the current character, the colour attribute, respectively the shape attribute, transmitted at the same time as the current character, or by default, the colour attribute, respectively the shape attribute, stored during transmission of a previous character.

An advantage of the invention is that it offers a greater choice in the display possibilities whilst requiring, as compared with the prior art, a memory space of size equal to only a parallel display attribute code.

According to a preferred embodiment of the invention, the value of the parallel display attribute transmitted is stored by a first storage means if it is a colour attribute and by second storage means if it is a shape attribute.

Thus, there is a storage means for the colour attribute and a storage means for the shape attribute. The colour attribute (respectively shape attribute) stored serves to define the appearance of the character transmitted in the first word to the screen when the second word contains a shape attribute (respectively a colour attribute). Moreover, during each character transmission it is possible to modify the value of the colour attribute stored or of the shape attribute stored, depending on the type of parallel attribute which is transmitted.

According to a particular embodiment, the parallel display attribute is stored by the second storage means only if at least two consecutive parallel display attributes transmitted are of shape attribute type.

Advantageously, the penultimate of the at least two consecutive parallel display attributes of shape attribute type is stored by the second storage means.

According to another particular embodiment, the parallel display attribute is stored by the first storage means only if at least two consecutive parallel display attributes transmitted are of colour attribute type.

Advantageously, the penultimate of the at least two consecutive parallel display attributes of colour attribute type is stored by the first storage means.

By virtue of these arrangements, it is possible, as will be seen later in the example of FIG. 2, to modify both the colour and the shape between two consecutive characters.

According to a particular embodiment, the parallel display attribute transmitted in the second word is stored directly by the appropriate storage means only when a predetermined specific character code is transmitted in the first word.

Thus, it is possible to force storage of the parallel display attribute when necessary, without waiting to have two consecutive attributes of the same type (shape attribute or colour attribute).

Advantageously, the predetermined specific character code corresponds to the space character.

According to a particular embodiment, the predetermined specific character code belongs to a subset among the serial display attribute codes.

According to a particular embodiment, the first and the second word are of equal length (N=M bits).

Advantageously, the first and the second word are 8 bits long.

According to a particular embodiment, a device for generating characters in a video system implementing the process according to the invention comprises:

a) a memory in which are held the codes of the characters to be displayed and the codes of the parallel display attributes of the characters, the display attributes being of the shape attribute type or of the colour attribute type, the memory comprising as output a character data bus and an attribute data bus;

b) an attribute decoding circuit which receives the attribute data bus as input and comprises
 a decoder of the attribute type transmitted and
 at least one memory for storing a display attribute received,
 the decoder outputting to a shape attribute data bus and to a colour attribute data bus, either the code of the attribute received from the attribute data bus, or the code of the attribute stored, depending on the type of attribute transmitted on the attribute data bus;

c) a read-only memory containing the character models and receiving as input the character data bus;

d) a pixel processor receiving from the read-only memory, by way of a shift register, data bits corresponding to the character models, and receiving check bits for the shape and colour attribute buses, the pixel processor deriving the RGB signals corresponding to the text to be displayed.

According to a particular embodiment, the said device comprises a first memory for storing the colour attributes and a second memory for storing the shape attributes.

According to a particular embodiment, the device furthermore comprises a first and a second multiplexers, which are controlled by the decoder of the type of attribute transmitted, the code of the attribute received from the attribute data bus being transmitted:

either to the colour attribute bus by the first multiplexer, the shape attribute bus receiving the shape attribute stored in the second memory by way of the second multiplexer;

or to the shape attribute bus by the second multiplexer, the colour attribute bus receiving the colour attribute stored in the first memory by way of the first multiplexer.

According to a particular embodiment, the device furthermore comprises a memory for storing the previous shape attribute transmitted on the shape attribute bus, the previous shape attribute being stored in the second memory only when two attributes transmitted consecutively on the attribute data bus are of shape attribute type.

According to a particular embodiment, the decoder of the type of attribute transmitted comprises as output a line received on a first input of a logic AND, the second input of the logic AND receiving the line after a delay corresponding to the duration of transmission of a character, the output of the logic AND indicating whether two consecutive attributes of shape type have been transmitted and controlling a third multiplexer, which delivers either the previous shape attribute, or the shape attribute already stored to the second memory.

According to a particular embodiment, the device furthermore comprises a decoder module for decoding the character code transmitted on the character data bus, the decoder module controlling a fourth multiplexer so as directly to store the shape attribute transmitted on the attribute data bus when a predetermined specific character code is detected.

BRIEF DESCRIPTION OF THE DRAWINGS

Other characteristics and advantages of the invention will emerge via the following description of a particular non-limiting embodiment of the invention given with reference to the appended figures in which.

DESCRIPTION OF THE PREFERRED EMBODIMENT

Figure 1:
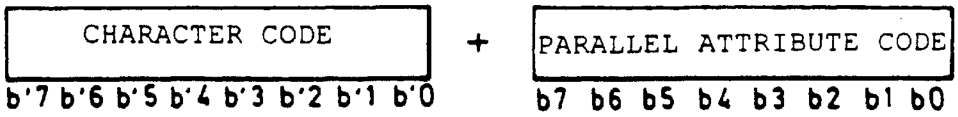
FIG. 1 diagrammatically represents the coding of a character and of its associated parallel display attribute in accordance with the invention.

Represented diagrammatically in FIG. 1 are the character code and the parallel attribute code such as they are stored in the random-access memory (RAM). The code corresponding to the character or to the serial display attribute is stored over 8 bits, referenced b'0 to b'7, thereby offering 256 possibilities of different codes.

Likewise, the parallel attribute code is stored over 8 bits, denoted b0 to b7, among which the most significant bit b7 is termed the selection bit. Depending on whether the value of b7 is equal to 1 or to 0 respectively, the bits b0 to b6 respectively contain a shape attribute or a colour attribute. There are thus 128 possibilities of different codes for the shape attribute as well as for the colour attribute.

Figure 2A:
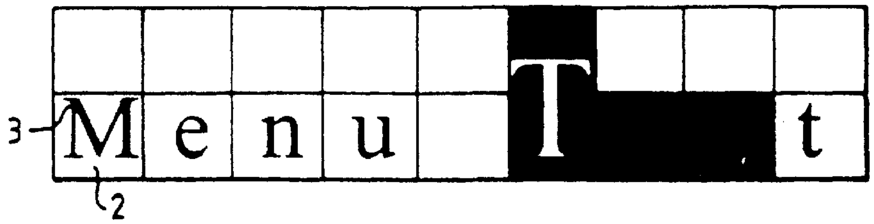
FIGS. 2*a*–2*e* represents an example of the implementation of the process according to the invention.
Figure 2B:
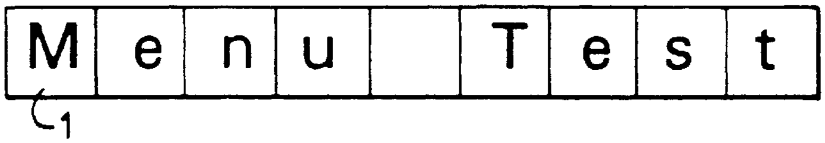
Figure 2C:
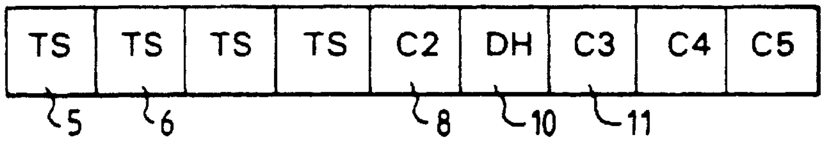
Figure 2D:
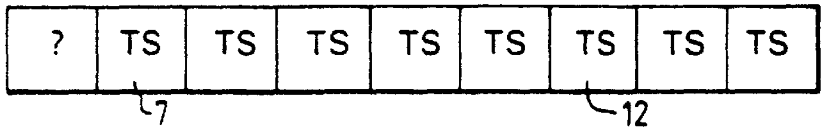
Figure 2E:
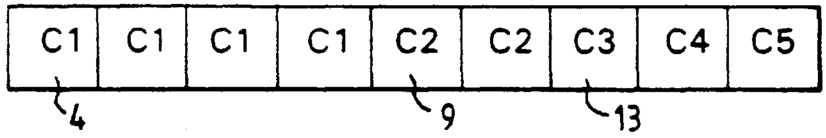

FIG. 2 illustrates an example of displaying characters according to the invention. This example is in accordance with the preferred embodiment of the invention according to which on the one hand a colour attribute and on the other hand a shape attribute are stored. This solution actually offers the most display possibilities although it is also possible to use a single memory to store either the colour attribute or the shape attribute, alternately. Represented in succession are:

in FIG. 2*a*, the characters such as they appear on the screen;

in FIG. 2*b*, the contents of the corresponding character code;

in FIG. 2*c*, the contents of the corresponding parallel attribute code;

in FIG. 2*d*, the shape attribute stored; and in FIG. 2*e*, the colour attribute stored.

It will be noted that, in FIGS. 2*b* to 2*e*, each square such as that referenced 1 in FIG. 2*b* in fact represents a code having a size of one byte. For the sake of simplicity, FIG. 2*b* depicts the character itself and not its code and in FIGS. 2*c* to 2*e* simplified codes have been used for the parallel attributes.

'TS' stands for 'single size', 'DH' stands for 'double height' and 'C1' to 'C5' correspond to different colours (character shape and background colours).

Thus, C1 corresponds for example to a yellow character background 2 and to a blue character shape 3.

Focusing on the first character 'M', it may be observed that the stored colour attribute 4 contains the code C1 which was stored during the transmission of an earlier character.

The parallel attribute transmitted 5 contains a shape attribute TS which is applied to the current character 'M'. The latter therefore appears on the screen in single size and with the colour corresponding to the code C1 of the stored colour attribute.

The next character 'e' contains a shape attribute TS in its parallel attribute code 6. According to a particular embodiment of the invention, since two shape attributes 5, 6 have been transmitted consecutively, the first 5 of the two will be stored at 7.

Focusing now on the space character situated after the 'u' character, it may be observed that the parallel attribute 8 contains a colour attribute C2. In the present example, it is assumed that when the parallel attribute transmitted is of colour attribute type, it is stored forthwith in the corresponding memory area. This is apparent at 9 in FIG. 2*e*.

The next character 'T' contains a shape attribute DH in its parallel attribute 10. The character 'T' will therefore appear with double height and with a colour in accordance with the colour attribute C2 (red character background and yellow shape) stored previously.

The next character 'e' contains a colour attribute C3 in its parallel attribute 11. The character 'e' will therefore appear on the screen with a new colour (green background and black shape). Since two consecutive shape attributes were not transmitted, the value of the stored shape attribute 12 has not been changed and is still TS. Consequently the character 'e' will appear on the screen with a single size. Moreover, the colour attribute C3 is stored at 13.

It will be noted that, by virtue of the invention, it has been possible to modify, between two consecutive characters 'T' and 'e' not only the size of the character but also the colour of the background and of the shape.

The following characters 's' and 't' each contain a colour attribute (C4 and C5) in their parallel attribute, and hence they will appear on the screen in single size and with new colours.

The invention thus offers multiple display possibilities which render the depiction of the characters much more attractive than in the prior art.

Figure 3:
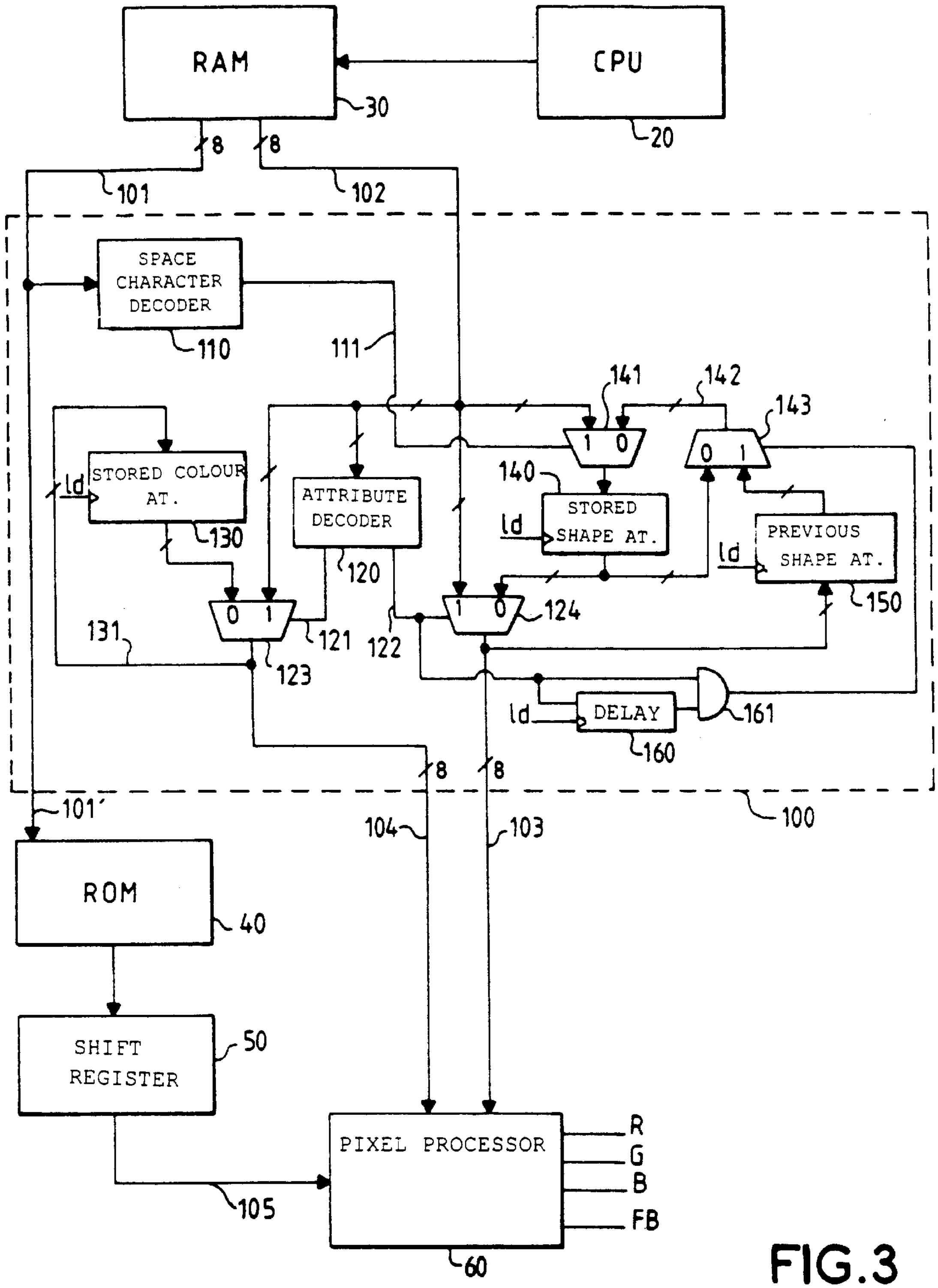
FIG. 3 represents diagrammatically a device for generating characters implementing the invention.

FIG. 3 shows a device for generating characters which is included within a video signal receiver (not represented) such as a television monitor or a video recorder. This device is advantageously produced in the form of an integrated circuit and can accomplish other functions which are not the subject of the present invention.

Only those elements necessary for understanding the invention have been represented in FIG. 3.

The device for generating characters of the invention comprises a CPU 20 (Central Processor Unit) which supplies a RAM 30 with addresses of characters according to the text which is to be displayed on the screen.

The RAM 30 stores, on the one hand the codes corresponding to the characters to be displayed, on 8 bits, and on the other hand the display attributes of each of these characters, also on 8 bits, according to the coding model depicted in FIG. 1.

At the output of the RAM 30 there is a data bus 101 containing the codes of the characters, and which will be referred to as the character bus hereinafter, and a data bus 102 containing the parallel display attributes, and which will be referred to as the attribute bus hereinafter. Each of these buses is 8 bits wide.

In practice, there may, depending on the organization of the RAM 30, be a single 16-bit data bus or alternatively two physically separate data buses each of 8 bits.

The character bus 101 and the attribute bus 102 are transmitted to an attribute decoding circuit 100 which will be described subsequently in greater detail and which comprises as output: a character bus 101', a data bus 104 containing colour attributes (defining the colour of the background and of the shape of the characters) and a data bus 103 containing shape attributes (defining the size, underlining, etc. of the characters).

The character bus 101' is transmitted to a ROM 40 which contains the character fonts in memory. Each character code transmitted by the bus 101' corresponds to an address of the ROM in which is stored the matrix of the character in the form of 10×10 pixels.

The matrix is then transmitted to a shift register 50 which transmits the lines of 10 pixels one by one to a pixel processor 60 which derives, in a manner known per se, from the data bits transmitted by the bus 105 and from the check bits transmitted by the colour attribute bus 104 and shape attribute bus 103, the RGB signals relating to the text to be displayed.

The pixel processor also derives an insertion signal FB (standing for "Fast Blanking") which makes it possible either to insert the text to be displayed in place of the video signal, or to display the text in transparent mode with respect to the video signal.

We shall now describe the attribute decoding circuit 100.

The circuit 100 comprises an attribute decoder module 120 which receives the attribute bus 102 as input. The attribute decoder 120 considers only the most significant bit b7 (selection bit) of each parallel attribute code. If the value of b7 is '1', then the attribute decoder will place the '1' level on the line 122 containing the cue relating to the shape attribute, and the '0' level on the line 121 containing the cue relating to the colour attribute.

Conversely, in the case where b7=0, the '0' level will then exist on the line 122 and the '1' level on the line 121.

The line 121 controls a multiplexer 123. When the latter receives a '1' level of the line 121, this signifies that the current parallel attribute transmitted on the bus 102 is a colour attribute. The multiplexer 123 therefore outputs, on the colour attribute bus 104, the attribute code received from the attribute bus 102.

On the other hand, when the multiplexer 123 receives a '0' level from the line 121, signifying the presence of a shape attribute on the bus 102, it supplies the bus 104 with the code of the colour attribute stored previously by the first memory 130.

This first memory 130 consists of eight storage flip-flops which make it possible to store eight bits in total, i.e. a colour attribute code. The storage flip-flops are regulated by a clock signal Id, termed the LOAD signal, which is represented in FIG. 4*c*.

Figure 4:
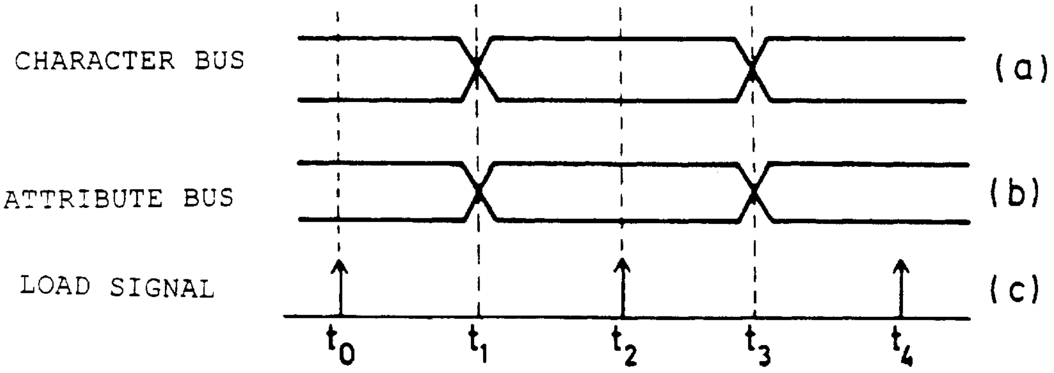
FIG. 4 represents time charts for certain signals of FIG. 3.

Referring to FIG. 4, the changes of state of the character bus and of the attribute bus which occur at the same instants $t_1$ and $t_3$ may be seen in FIGS. 4*a* and 4*b* respectively. The difference $t_3-t_1$ represents the period of the signal regulating the data buses 101 and 102.

The LOAD signal consists of pulses occurring at the instants to, $t_2$ and $t_4$ (in FIG. 4*c*). This signal has the same period as the signal regulating the data buses 101 and 102. This is because the following relation holds: $t_3-t_1=t_2-t_0$. On the other hand, the pulses of the LOAD signal are shifted with respect to the instants of change of state of the data buses 101 and 102. This has the purpose, the LOAD signal serving to regulate a certain number of operations in the circuit of FIG. 3, of guaranteeing stability of the data present on the buses 101 and 102 at the time of the operations for reading these buses. The LOAD signal also serves to advance the addresses in the RAM 30.

Returning to FIG. 3, the first memory 130 receives as input the output from the multiplexer 123 by way of the bus 131. Thus, if the attribute bus 102 contains a colour attribute, it is the code of this colour attribute which is stored at 130 and if the bus 102 contains a shape attribute, the value stored at 130 remains unchanged.

The manner of operation of the multiplexer 123 as a function of the level of the signal present on the line 121 which was described earlier applies also to the multiplexer 124 and to the line 122. Likewise, the second memory 140 for storing the shape attribute is identical, in its makeup and its manner of operation, to the first memory 130.

On the other hand, according to the embodiment chosen in the example of FIG. 3, the processing of the storage of the shape attributes comprises variants relative to the storage of the colour attributes.

The first variant consists in storing a shape attribute in the second memory 140 only if two consecutive shape attributes have been transmitted on the attribute bus 102, the first of the two shape attributes being stored.

To do this, a logic AND 161 receives as input, on the one hand the line 122 and on the other hand the line 122 after a delay 160, the delay 160 consisting of a flip-flop clocked by the LOAD signal Id described above.

The output of the logic AND 161 will be at the '1' level when two shape attributes have been transmitted consecutively on the bus 102, at the same time transmitting two '1' levels one after the other on the line 122.

The output of the logic AND controls a multiplexer 143. The latter outputs to a bus 142:

- either (when the output of the logic AND is at the '1' level) the shape attribute transmitted with the previous character, and stored by a memory 150 consisting of eight flip-flops, this making it possible to store the first of the two consecutive shape attributes;
- or (when the output of the logic AND is at the '0' level), the shape attribute stored at 140.

The bus 142 is linked to the input of the second memory 140 by way of a multiplexer 141 which will be described below.

Thus, to summarize, when two consecutive shape attributes are transmitted on the attribute bus 102, the first of the two is stored at 140, otherwise the stored shape attribute remains unchanged.

According to the second variant, it is nevertheless possible in certain cases to force the storage of a shape attribute transmitted in isolation. In the example of FIG. 3, the case will arise when a space character is transmitted on the bus 101 at the same time as a shape attribute is transmitted on the bus 102.

To do this, a decoder module 110 for decoding the space character code receives the character bus 101 as input and outputs a '1' level to a line 111 when the character code received as input corresponds to the space character and a '0' level otherwise. The line 111 controls the multiplexer 141 which supplies the second memory 140 with either the shape attribute present on the bus 102 when a space character has been detected on the bus 101, or the shape attribute received from the bus 142 described above otherwise.

It is also possible to force the storage of a shape attribute transmitted in isolation when certain particular serial display attributes are transmitted on the bus 101, for example a serial attribute modifying the colour of the background of the characters or a serial attribute modifying the colour of the shape of the characters.

The outputs of the multiplexers 123 and 124 are linked respectively to the output buses, 104 for the colour attributes and 103 for the shape attributes, of the circuit 100.

The embodiment described in FIG. 3, in which the mode of storage of the colour attributes is different from the mode of storage of the shape attributes, can of course be reversed by applying the processing of the shape attributes to the colour attributes and vice versa.

What is claimed is:

1. Process for displaying characters and improving efficiency of associated display attributes comprising the steps of:

receiving from a memory:

- a character code value in a first word of N bits, wherein N is a natural integer;
- a display attribute value, a so-called parallel attribute, defining one of a color or shape attribute type associated with said character code value, in a second word of M bits, M being a natural integer, comprising one selection bit whose value indicates whether the parallel display attribute transmitted is a color attribute type or a shape attribute type;

storing the value of the parallel display attribute received; and using, for display of the current character identified by said character code value, the color attribute value or the shape attribute value, received at the same time as the current character, and attribute values stored during reception of previous characters for an attribute type other than the attribute type received with the current character, so that the display attribute value with M-bit may control a color or a shape attributes of the current character, each attribute with a resolution of (M−1)-bit wherein:

- the value of the parallel display attribute received is stored by a first storage means if it is a color attribute and by second storage means if it is a shape attribute;
- the parallel display attribute is stored by the first storage means only if at least two consecutive parallel display attributes received are of color attribute type; and
- the penultimate of the at least two consecutive parallel display attributes of color attribute type is stored by the first storage means.

2. Process according to claim 1, wherein the parallel display attribute received in the second word is stored directly by the appropriate storage means only when a predetermined specific character code is received in the first word.

3. Process according to claim 2, wherein the predetermined specific character code corresponds to the space character.

4. Process according to claim 2, wherein the predetermined specific character code belongs to a subset among the serial display attribute codes.

5. Process according to claim 1, wherein the first and second word are of equal length.

6. Process according to claim 5, wherein the first and the second word are 8 bits long.

7. Process for displaying characters and improving efficiency of associated display attributes comprising the steps of:

receiving from a memory:

a character code value in a first word of N bits, wherein N is a natural integer;

a display attribute value, a so-called parallel attribute, defining one of a color or shape attribute type associated with said character code value, in a second word of M bits, M being a natural integer, comprising one selection bit whose value indicates whether the parallel display attribute transmitted is a color attribute type or a shape attribute type;

storing the value of the parallel display attribute received; and using, for display of the current character identified by said character code value, the color attribute value or the shape attribute value, received at the same time as the current character, and attribute values stored during reception of previous characters for an attribute type other than the attribute type received with the current character, so that the display attribute value with M-bit may control a color or a shape attributes of the current character, each attribute with a resolution of (M-1)-bit wherein:

the value of the parallel display attribute received is stored by a first storage means if it is a color attribute and by second storage means if it is a shape attribute;

the parallel display attribute is stored by the second storage means only if at least two consecutive parallel display attributes received are of shape attribute type; and the penultimate of the at least two consecutive parallel display attributes of the shape attribute type is stored by the second storage means.

8. Process according to claim 7, wherein the parallel display attribute received in the second word is stored directly by the appropriate storage means only when a predetermined specific character code is received in the first word.

9. Process according to claim 8, wherein the predetermined specific character code corresponds to the space character.

10. Process according to claim 8, wherein the predetermined specific character code belongs to a subset among the serial display attribute codes.

11. Device for generating characters in a video system, comprising:

a memory in which are stored codes of characters to be displayed and codes of parallel display attributes of said characters, the display attributes being of shape attribute type or color attribute type;

an attribute decoding circuit for outputting either a display attribute received with a current character or a display attribute previously stored, depending on the type of the displayed attribute received wherein the attribute decoding circuit comprises a first means for storing color attributes and a second means for storing shape attributes; and a pixel processor for deriving video signal in response to the output of the attribute decoding circuit and the codes of the characters to be displayed; and a first and a second multiplexing means, which are controlled by the attribute decoding circuit for decoding the type of attribute transmitted, wherein the code of the attribute received from an attribute data bus being transmitted:

either to a color attribute bus by the first multiplexing means, a shape attribute bus receiving the shape attribute stored in the second storage means by way of the second multiplexing means; or to the shape attribute bus by the second multiplexing means, the color attribute bus receiving the color attribute stored in the first storage means by way of the first multiplexing means.

12. Device according to claim 11, furthermore comprising a means for storing the previous shape attribute transmitted on the shape attribute bus, the previous shape attribute being stored in the second storage means only when two attributes transmitted consecutively on the attribute data bus are of shape attribute type.

13. Device according to claim 12, wherein the means for decoding the type of attribute transmitted comprises as output a line received on a first input of a logic AND, the second input of the logic AND receiving the line after a delay corresponding to the duration of transmission of a character, the output of the logic AND indicating whether two consecutive attributes of shape type have been transmitted and controlling a third multiplexing means, which delivers either the previous shape attribute, or the shape attribute already stored to the second storage means.

14. Device according to claim 13, furthermore comprising a decoder module for decoding the character code transmitted on a character data bus, the decoder module controlling a fourth multiplexing means so as directly to store the shape attribute transmitted on the attribute data bus when a predetermined specific character code is detected.

15. Process for displaying characters and improving efficiency of associated display attributes comprising the steps of:

receiving from a memory:

a character code value in a first word of N bits, wherein N is a natural integer;

a display attribute value, a so-called parallel attribute, defining one of a color or shape attribute type associated with said character code value, in a second word of M bits, M being a natural integer, comprising one selection bit whose value indicates whether the parallel display attribute transmitted is a color attribute type or a shape attribute type wherein the first word and the second word are of equal length;

storing the value of the parallel display attribute received; and using, for display of the current character identified by said character code value, the color attribute value or the shape attribute value, received at the same time as the current character, and attribute values stored during reception of previous characters for an attribute type other than the attribute type received with the current character, so that the display attribute value with M-bit may control a color or a shape attributes of the current character, each attribute with a resolution of (M−1)-bit.

* * * * *